US010867460B1

(12) United States Patent
Miller et al.

(10) Patent No.: US 10,867,460 B1
(45) Date of Patent: Dec. 15, 2020

(54) SYSTEM AND METHOD TO PROVIDE PUBLIC SAFETY ACCESS TO AN ENTERPRISE

(71) Applicant: MOTOROLA SOLUTIONS, INC., Chicago, IL (US)

(72) Inventors: Trent J Miller, West Chicago, IL (US); Lee M Proctor, Cary, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/590,510

(22) Filed: Oct. 2, 2019

(51) Int. Cl.
*G07C 9/37* (2020.01)

(52) U.S. Cl.
CPC ........... *G07C 9/37* (2020.01); *G07C 2209/08* (2013.01)

(58) Field of Classification Search
CPC ............. H04W 12/08; H04W 12/0023; H04W 12/00514; H04W 76/50; H04W 12/0608; H04W 4/90; H04W 12/004; H04W 4/10; H04W 76/45; H04W 12/06; H04W 84/12; G07C 9/37; G07C 2209/08; G07C 9/25; G07C 9/33; G06F 3/016; G06F 3/0418; G06F 21/32; G06F 3/04186; G06K 9/00; G06K 9/036; G06K 9/00912; G06K 9/0055

See application file for complete search history.

(56) References Cited

U.S. PATENT DOCUMENTS

| 8,255,698 | B2 | 8/2012 | Li et al. |
| 8,340,366 | B2 | 12/2012 | Masuda et al. |
| 8,401,245 | B2 | 3/2013 | Hashimoto |
| 10,230,723 | B2 | 3/2019 | Korus et al. |
| 10,445,957 | B2 * | 10/2019 | Savolainen ............. H04W 4/90 |
| 2006/0291001 | A1 | 12/2006 | Sung et al. |

(Continued)

FOREIGN PATENT DOCUMENTS

| IN | 3012/MUM/2011 A | 12/2012 |
| WO | 02095657 A2 | 11/2002 |
| WO | 2009146315 A1 | 12/2009 |

OTHER PUBLICATIONS

Paula Tjandra et al.: "Public Safety Systems and Methods for Network Access", U.S. Appl. No. 16/237,217, filed Dec. 31, 2018, all pages.

(Continued)

*Primary Examiner* — Brian E Miller

(57) ABSTRACT

A method for providing public safety access to an enterprise is provided. The method may include receiving an indication of an incident at an enterprise location. The method may further include determining a type of biometric access control in use at the enterprise location. The method may further include retrieving biometric data for a responder assigned to the incident is compatible with the type of biometric access control in use at the enterprise location. The method may also include adapting the biometric data to be compatible with a specific biometric access control system in use at the enterprise location. The method may additionally include sending the adapted biometric data to the specific biometric access control system in use at the enterprise location, wherein the specific biometric access control system in use at the enterprise location grants access to the enterprise location to the responder.

20 Claims, 6 Drawing Sheets

(56) References Cited

U.S. PATENT DOCUMENTS

| | | | |
|---|---|---|---|
| 2010/0066493 A1* | 3/2010 | Rachlin | G06F 21/32 |
| | | | 340/5.82 |
| 2010/0074476 A1* | 3/2010 | Aoki | G06K 9/00885 |
| | | | 382/115 |
| 2011/0187493 A1 | 8/2011 | Elfstroem et al. | |
| 2014/0167954 A1* | 6/2014 | Johnson | H04W 4/029 |
| | | | 340/539.11 |
| 2015/0015365 A1* | 1/2015 | Ortiz | G07C 9/25 |
| | | | 340/5.53 |
| 2016/0189455 A1* | 6/2016 | Lee | G07C 9/37 |
| | | | 340/5.52 |
| 2016/0234828 A1* | 8/2016 | Smith | H04W 4/90 |
| 2016/0308859 A1 | 10/2016 | Barry et al. | |
| 2016/0344747 A1* | 11/2016 | Link, II | G06F 21/35 |
| 2017/0148241 A1* | 5/2017 | Kerning | H04W 4/14 |
| 2017/0243225 A1* | 8/2017 | Kohli | G07C 9/37 |
| 2018/0025563 A1* | 1/2018 | Kerning | G08B 25/016 |
| | | | 340/5.52 |
| 2018/0027411 A1 | 1/2018 | Taneja | |
| 2018/0089915 A1 | 3/2018 | Lundberg | |
| 2019/0220583 A1 | 7/2019 | Douglas et al. | |
| 2019/0286796 A1 | 9/2019 | Schuler et al. | |
| 2020/0213831 A1* | 7/2020 | Tjandra | H04W 12/0608 |

OTHER PUBLICATIONS

Schuler, Francesca et al.: "Device, System and Method for Managing Access Authorizations of Devices", U.S. Appl. No. 15/921,744, filed Mar. 15, 2018, all pages.

* cited by examiner

SYSTEM AND METHOD TO PROVIDE PUBLIC SAFETY ACCESS TO AN ENTERPRISE

BACKGROUND

The increase in mass shootings and workplace violence has caused a renewed focus on security. In particular, enterprises (e.g. a corporation, privately owned company, charitable organization, churches, etc.) are devoting significant amounts of time and money to ensure security of physical enterprise locations. For example, some enterprises may utilize a security guard who checks credentials of everyone entering the enterprise location. In some cases, the credential verification may be automated. For example, many buildings include security gates that do not permit a person to enter a location without presenting a specific token, such as an identification badge. The identification badge may include a magnetic stripe or radio frequency ID (RFID) tag that includes data related to the access rights of the individual in possession of the token. The security token may be presented to the automated gate system and the presenter may be granted/denied access to the enterprise location based on their access rights.

Although using a security token to grant access to enterprise locations is better than no security at all, problems may still arise. For example, security tokens, such as security badges, can be lost or stolen. Until such time as the lost or stolen token is reported and deactivated, a nefarious actor may utilize the token to gain access to an enterprise location. One way of overcoming the problem of lost or stolen tokens is to switch to biometric based access systems. For example, fingerprints, facial recognition, voice prints, iris scans, vein patterns, thermal patterns, gait, gestures, optical gaze, heart and breathing patterns, etc. are all currently available biometric identifiers that may be used by access control systems to determine if an individual should be granted access to the enterprise location. It is difficult (although not impossible) for biometric identification information to be falsified. Thus, it can be almost certain that when biometric data presented by a person matches that which is stored in the access control system, the person presenting the biometric data is truly associated with the record stored in the access control system.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
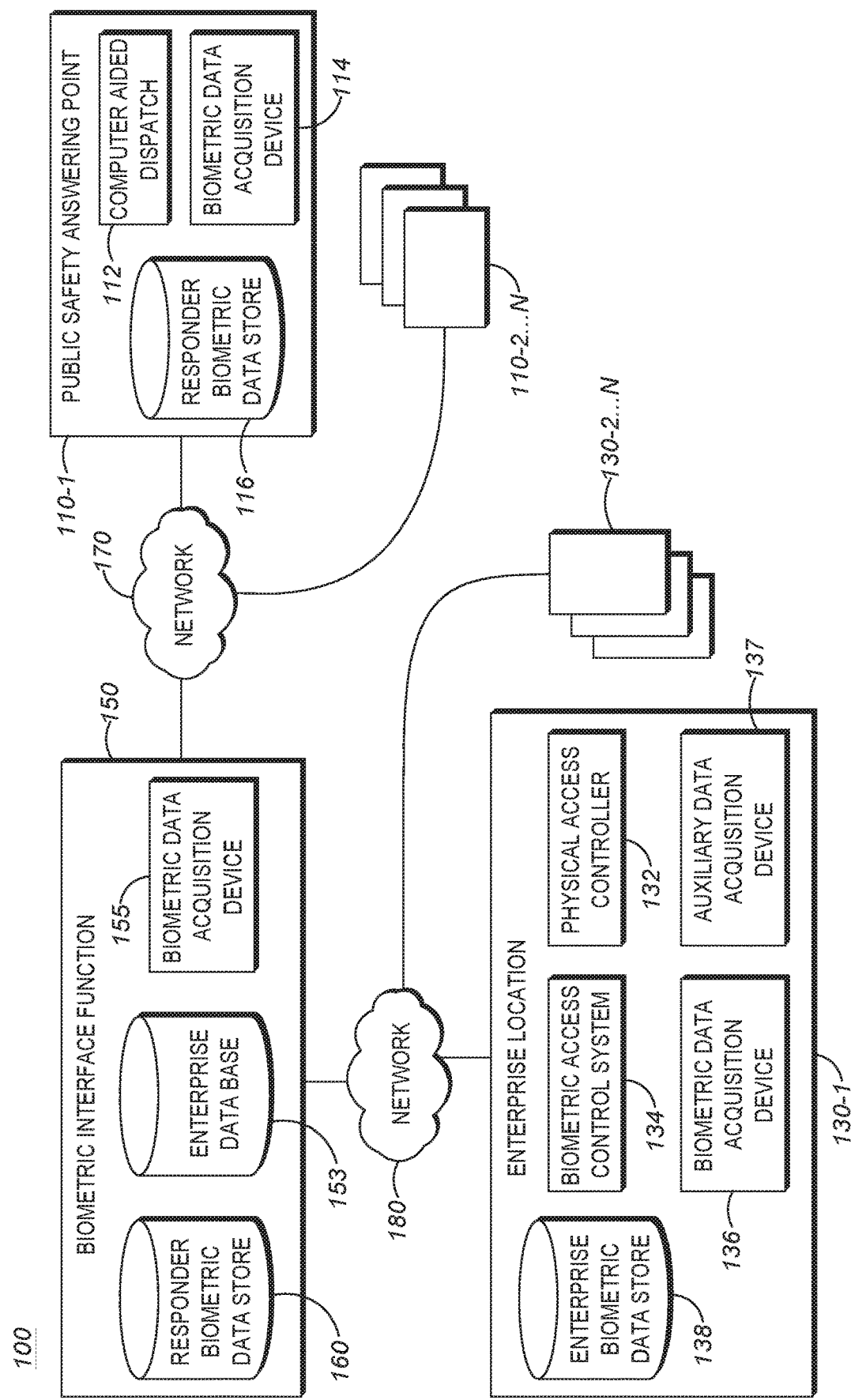
FIG. 1 is an example environment in which the techniques to provide public safety with access to an enterprise may be implemented.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Although the focus on enterprise physical security has caused enterprise locations to become more secure, those same security measures may prove to be a hindrance to public safety first responders responding to an incident that occurs at an enterprise location. For example, an individual at an enterprise location may experience a medical emergency, such as a heart attack, and call an emergency number, such as 911, to request emergency medical service (EMS) assistance. EMS responders may be dispatched to the enterprise location.

Upon arrival, the first responders may be faced with an access control system at the enterprise location. Without proper credentials, the first responders may be denied access to the enterprise location and cannot provide the requested assistance. There are several techniques that are used to overcome this problem, but each of those techniques introduces additional problems. For example, a security guard may be stationed at a designated public safety entrance point and allow entrance to the first responders. The security guard is an additional expense to the enterprise and the solution is only effective while the security guard is on duty. For example, if the medical emergency occurs outside of normal business hours, there may be no security guard present to let the first responders in. In the alternative, staffing a security guard 24 hours a day could become cost prohibitive.

Another common way the problem of access control has been addressed in the past is for each enterprise to designate a code, such as a personal identification number (PIN) code that can be provided to first responders. Upon arrival, first responders may override the access control system using the PIN. The problem with this solution is that the PIN must be widely distributed to large number of public safety personnel across a wide variety of agencies, because it cannot be known in advance what type of incident will occur or who will be responding to the incident at the enterprise location. At minimum, the PIN would need to be distributed to Police, Fire, and EMS personnel. Furthermore, there is nothing preventing a malicious actor who knows the PIN from overriding the access control system at any time, including when there is no incident currently in progress at the enterprise location.

Additional problems exist in systems that are based on biometric authentication. Providing biometric information of every possible first responder to every enterprise access control system that utilizes biometric access control is infeasible. In addition, each enterprise may use a different type of biometric authentication factor (e.g. facial recognition, voice recognition, fingerprint, etc.) and may use systems provided by different vendors. Each of those systems may further have its own requirements on the specific algorithms used when authenticating a piece of biometric data. For example, one fingerprint system may require a 5-point print match, while another may require a 12-point match. Furthermore, the problem still remains that a first responder would be able to access the enterprise at any time, not just when an incident is in progress.

The techniques described herein overcome these problems and others, individually and collectively. A biometric interface function (BIF) is provided. The BIF has accessible to it a variety of biometric information for all public safety responders. The BIF is also coupled to one or more public safety answering points (PSAP)s which may include computer aided dispatch (CAD) systems. It is through the CAD system that incidents are created and first responders dispatched to those incidents. Finally, the BIF may be coupled to a plurality of enterprise locations that utilize biometric access control systems.

When an incident occurs, the incident may be communicated to a PSAP (e.g. 911 call center). An incident record may be created. The incident record may include information such as the address of the incident. First responders may then be assigned to the incident and dispatched to the incident location. If the incident is located at an enterprise location, the incident information may be forwarded to the BIF. The BIF may determine if biometric access control is utilized by the enterprise location. If so, the BIF may determine the type of biometric access control that is in place (e.g. facial recognition, voice print, fingerprint, etc. or combinations thereof). The BIF may also determine the requirements of the specific biometric access control system in use at the enterprise (e.g. 12 point fingerprint match, specific algorithm used for facial recognition, biometric data input quality (e.g. 64 kpbs sampling for voice recognition), etc.).

The BIF may then retrieve the biometric data. If necessary, the BIF may adapt the biometric data to be in a form that is usable by the enterprise biometric access control system. The BIF may then send the adapted biometric data to the enterprise access control system with an indication that an incident is occurring and that access is being requested. The enterprise access control system can then store the adapted biometric data and grant temporary access to people who arrive at the enterprise location and present biometric data that matches the adapted data. For example, the BIF may retrieve stored high resolution images of the responders assigned to an incident at the enterprise and enroll those images in the enterprise facial recognition system. In another embodiment, the BIF may prompt responders through their mobile device to provide biometric information, such as facial image(s), voice samples, and the like. In another embodiment, the BIF may retrieve deep learning Artificial Intelligence (AI) model data of the assigned responders and adapt that data for the AI model and pipeline in use at the enterprise. Upon arrival at the incident, the first responders provide their biometric data (e.g. allow facial image to be captured, provide fingerprint, etc.). If the biometric data matches the adapted biometric data, then the first responders may be granted access. Upon incident completion, the adapted biometric data may be purged from the enterprise biometric access control system, thus preventing the first responder from attempting to access the enterprise location at a later time when no incident is in progress.

A method is provided. The method may comprise receiving, at a biometrics interface function (BIF), from a computer aided dispatch (CAD) system an indication of an incident at an enterprise location. The method may further comprise determining a type of biometric access control in use at the enterprise location. The method may additionally comprise retrieving biometric data for a responder assigned to the incident, the biometric data compatible with the type of biometric access control in use at the enterprise location. The method may also comprise adapting the biometric data to be compatible with a specific biometric access control system in use at the enterprise location. The method may also comprise sending the adapted biometric data to the specific biometric access control system in use at the enterprise location, wherein the specific biometric access control system in use at the enterprise location grants access to the enterprise location to the responder when the responder provides the biometric data upon arrival at the enterprise location and the provided biometric data matches the adapted biometric data within a confidence threshold.

In one aspect, the method may include revoking the access grant to the enterprise location upon conclusion of the incident. In one aspect, adapting the biometric data comprises at least one of: adapting the biometric data to a raw content format used by the specific biometric access control system and adapting the biometric data to an analytic model data used by the specific biometric access control system. In one aspect the method may further include sending, from the BIF to the specific biometric access control system, a request to relax the confidence threshold.

In one aspect, retrieving biometric data for the responder may comprise at least one of: retrieving the biometric data from a responder biometric data store, the responder biometric data store having previously stored the biometric data, requesting the responder provide the biometric data to the BIF prior to arrival at the enterprise location, receiving the biometric data from the CAD system.

In one aspect, determining the type of biometric access control in use at the enterprise location may further comprise at least one of: retrieving the type of biometric access control in use from a database including the type of biometric access control in use at the enterprise location and requesting, from the specific biometric access control system the type of biometric access control in use. In one aspect, the method may further comprise sending context based responder information to the specific biometric access control system, wherein access grant is based in part on the context based responder information.

A system is provided. The system may include a processor and a memory coupled to the processor. The memory may contain thereon a set of instructions that when executed by the processor cause the processor to receive, at a biometrics interface function (BIF), from a computer aided dispatch (CAD) system an indication of an incident at an enterprise location. The instructions may further cause the processor to determine a type of biometric access control in use at the enterprise location. The instructions may further cause the processor to retrieve biometric data for a responder assigned to the incident, the biometric data compatible with the type of biometric access control in use at the enterprise location. The instructions may further cause the processor to adapt the biometric data to be compatible with a specific biometric access control system in use at the enterprise location. The instructions may further cause the processor to send the adapted biometric data to the specific biometric access control system in use at the enterprise location, wherein the specific biometric access control system in use at the enterprise location grants access to the enterprise location to the responder when the responder provides the biometric data upon arrival at the enterprise location and the provided biometric data matches the adapted biometric data within a confidence threshold.

In one aspect the instructions may further cause the processor to revoke the access grant to the enterprise location upon conclusion of the incident. In one aspect, the instructions to adapt the biometric data comprises at least one of instructions to: adapt the biometric data to a raw content format used by the specific biometric access control system and adapt the biometric data to an analytic model data used by the specific biometric access control system. In one aspect the instructions may further cause the processor to send, from the BIF to the specific biometric access control system, a request to relax the confidence threshold.

In one aspect the instructions to retrieve biometric data for the responder may further comprise at least one of instructions to: retrieve the biometric data from a responder biometric data store, the responder biometric data store having previously stored the biometric data, request the responder provide the biometric data to the BIF prior to arrival at the enterprise location, and receive the biometric data from the CAD system.

In one aspect the instructions to determine the type of biometric access control in use at the enterprise location may further comprise at least one of instructions to: retrieve the type of biometric access control in use from a database including the type of biometric access control in use at the enterprise location and request, from the specific biometric access control system the type of biometric access control in use. In one aspect the instructions may further comprise instructions to send context based responder information to the specific biometric access control system, wherein access grant is based in part on the context based responder information.

A non-transitory processor readable medium containing a set of instructions thereon is provided. When executed by a processor the instructions may cause the processor to receive, at a biometrics interface function (BIF), from a computer aided dispatch (CAD) system an indication of an incident at an enterprise location. The instructions may further cause the processor to determine a type of biometric access control in use at the enterprise location. The instructions may further cause the processor to retrieve biometric data for a responder assigned to the incident, the biometric data compatible with the type of biometric access control in use at the enterprise location. The instructions may further cause the processor to adapt the biometric data to be compatible with a specific biometric access control system in use at the enterprise location. The instructions may further cause the processor to send the adapted biometric data to the specific biometric access control system in use at the enterprise location, wherein the specific biometric access control system in use at the enterprise location grants access to the enterprise location to the responder when the responder provides the biometric data upon arrival at the enterprise location and the provided biometric data matches the adapted biometric data within a confidence threshold.

In one aspect the instructions may further cause the processor to revoke the access grant to the enterprise location upon conclusion of the incident. In one aspect the instructions to adapt the biometric data may comprise at least one of instructions to: adapt the biometric data to a raw content format used by the specific biometric access control system and adapt the biometric data to an analytic model data used by the specific biometric access control system. In one aspect the instructions may further cause the processor to send, from the BIF to the specific biometric access control system, a request to relax the confidence threshold.

In one aspect the instructions to retrieve biometric data for the responder may comprise at least one of instructions to: retrieve the biometric data from a responder biometric data store, the responder biometric data store having previously stored the biometric data, request the responder provide the biometric data to the BIF prior to arrival at the enterprise location and receive the biometric data from the CAD system.

In one aspect the instructions to determine the type of biometric access control in use at the enterprise location may further comprise at least one of instructions to: retrieve the type of biometric access control in use from a database including the type of biometric access control in use at the enterprise location and request, from the specific biometric access control system the type of biometric access control in use.

FIG. 1 is an example environment in which the techniques to provide public safety with access to an enterprise may be implemented. Environment 100 may include one or more PSAPs 110-1 . . . n, one or more enterprise locations 130-1 . . . n, a BIF 150, network 170, and network 180. Although environment 100 is shown with a single BIF, it should be understood that this is for ease of description. The techniques described herein are not limited to any particular number of BIFs.

PSAPs 110-1 . . . n may be call centers that receive emergency calls (e.g. calls placed to 911, 999, or equivalent regional emergency numbers). PSAPs 110 receive emergency calls from the public that may be reporting incidents that require assistance from public safety personnel. Such incidents may include events, such as medical emergencies (e.g. person having a heart attack, etc.) requiring the assistance of EMS. Reported incidents may require assistance by the fire department (e.g. a fire, people trapped in elevator, etc.). Reported incidents may require assistance by the police department (e.g. assaults, murders, robberies, etc.). The techniques described herein are not limited to any particular type of incident requiring a response by any particular agency. What should be understood is that requests for assistance may be received at a PSAP 110.

In general, the location of the incident is available to a call taker at the PSAP 110. In some cases, the location may be provided through the enhanced 911 system, in which the communication system being used to access the PSAP 110 automatically provides the location of the incident. In other cases, the call taker may simply ask the person reporting the incident to provide the physical location of where the incident is occurring. What should be understood is that the PSAP 110 is made aware of the location of the incident. The particular mechanism used to inform the PSAP 110 of the incident location is unimportant.

Personnel at the PSAP 110 may then use a CAD 112 system to identify resources needed to respond to the incident. For example, a call taker may determine that an incident is a fire and that the fire department should be dispatched to the incident location. The call taker may notify a dispatcher that fire department personnel should respond to the incident. The dispatcher may then identify fire department resources that are available to respond to the incident using the CAD 112 system and dispatch the identified resources to the incident location. Although separate call takers and dispatchers have been mentioned, it should be understood that the same person may act as both the call taker and dispatcher. What should be understood is that the CAD 112 system is used to keep track of which individual people are being dispatched to the incident location.

The PSAP 110 may also include a biometric data acquisition (BDA) 114 device. The BDA 114 may be a device used to gather biometric data from the people who will be dispatched to respond to incidents. Examples of types of biometric data may include fingerprints, voiceprints, facial images, iris scans, deoxyribonucleic acid (DNA) sequences, or any other type of biological based information that can be used to identify an individual. The techniques described herein may utilize any type of biometric identifier that is currently known or developed in the future, so long as that identifier may be used to identify an individual based on biometric identifiers. BDA device 114 may be any device that may be utilized to capture a specific biometric identifier.

The BDA 114 may be used to capture biometric data associated with each individual that may respond to an incident. That biometric data and the identity of the individual associated with that biometric data may be stored in responder biometric data store (RBDS) 116. The BDA 114 may capture biometric data with a defined quality. For example, a facial image biometric may be captured at a given resolution (e.g. 12 mega pixels, etc.). A voiceprint may be captured at a certain sampling rate and encoded with a certain coding scheme (e.g. 64 kbps using a specific encoding scheme, etc.). Each particular type of biometric may be captured with a defined quality. The use of the defined quality is described in further detail below.

It should be noted that although BDA 114 is depicted as an element of the PSAP 110, the techniques described herein do not require that the biometric data be captured at the PSAP 110. For example, a first responder may provide their own biometric data (e.g. a picture of their face) by using their own device (e.g. smart phone camera). The BDA can also be a drone or autonomous machine designed to capture responder biometric data. The BDA 114 may be located at a remote enrollment center, where first responders may go to have their biometric information captured (e.g. at the police station, fire house, $3^{rd}$ party biometric data collection center, etc.). What should be understood is that in some implementations, the PSAP 110 may have a RBDS 116 that contains a record for each first responder, the record including one or more forms of biometric identification data, each of those pieces of biometric data captured at a defined quality. It should be further understood that other implementations may not store any biometric data at the PSAP 110 itself.

PSAPs 110 may be communicatively coupled with BIF 150 through network 170. Network 170 may be any communications capability that allows the PSAPs 110 to communicate with BIF 150. Examples of such capabilities may include wired or wireless networks, such as the Internet or intranets, 3G, 4G, 5G wireless cellular networks, Long Term Evolution (LTE) networks, WiFi networks, etc. Furthermore, PSAPs 110 may be coupled with BIF 150 through dedicated connections, such as leased point to point communications lines, etc. The techniques described herein are not dependent on any particular type of communications technology used for the network 170. Any communications technology that allows the PSAPs 110 to communicate incident data and, in some cases, responder biometric data, between the PSAP 110 and the BIF 150 are suitable for use with the techniques described herein.

Environment 100 may also include BIF 150. A single BIF 150 is shown for ease of description, but it should be understood that an environment may contain multiple BIFs 150. The BIF 150 may be implemented as a physical computing device. The BIF 150 may be implemented as a virtual computing device within a computing cloud infrastructure. The techniques described herein are not dependent on any particular form of implementation of the BIF 150.

The BIF 150 may include a BDA 155. The BDA 155 may be very similar to BDA 114 in that it may be a device that is used to capture biometric data at a defined quality. Just as with BDA 114, BDA 155 is not necessarily an element of the BIF 150 and does not require that the biometric data be captured at the BIF 150 location. The BDA 155 may actually be a remote device, such as a device used by a first responder (e.g. smart phone) to capture and provide his own biometric data. The BDA 155 may be located at a remote enrollment center, where first responders may go to have their biometric information captured (e.g. at the police station, fire house, $3^{rd}$ party biometric data collection center, etc.). The BDA 155 may also be an interface with the PSAP 110, wherein first responder biometric data is sent from the PSAP 110 to the BIF 150 via network 170.

The BIF 150 may also include RBDS 160. Just as with RBDS 116, RBDS 160 may contain a record for each first responder, the record including one or more forms of biometric identification data, each of those pieces of biometric data captured at a defined quality. In some implementations, RBDS 160 may be pre-populated with biometric data for all first responders, regardless of if the responder is associated with an incident. In other implementations, RBDS 160 may only contain biometric data of those responders currently assigned to an incident, as designated by the CAD 112 at the PSAP 110. Operation of the BIF 150 is described in further detail below.

Environment 100 may also include a plurality of enterprise locations 130-1 . . . n. For purposes of this description, an enterprise location 130 is any location that includes physical biometric access control (e.g. gates, door locks, etc.) that allows entry to only those individuals who provide biometric data that meets specified criteria, as will be described in further detail below. Examples of enterprise locations 130 can include a corporate campus, a corporate building, a shared commercial building, schools, churches, college campuses, etc. The techniques described herein are applicable to any location that utilizes biometric access control and will be referred to generically as enterprise locations 130.

The enterprise location 130 may include a physical access controller 132. The physical access controller 132 may be coupled to a physical access control device (not shown), which is a device that can physically prevent access to an enterprise location and can be operated by commands from the physical access controller 132. Examples of physical access control devices may include electronically locked doors, gates, fences, elevators, escalators, mantrap doors, etc. The techniques described herein are not dependent on any particular type of physical access control system or device. The physical access controller 132 may cause the physical access control devices to either permit or deny entry of a person to the enterprise location 130.

The enterprise location 130 may also include a biometric access control system 134. Accordingly, the biometric access control system 134 may be coupled to a BDA 136 device that may be used to capture biometric data. What should be noted is that unlike BDA 114 and BDA 155, BDA 136 may typically be located at the enterprise location. In some cases, the BDA 136 may be located in close proximity to the physical access control device. For example, a camera used for facial recognition may be placed adjacent to a door that is controlled by the physical access controller 132. When proper biometric data (e.g. an image of a face) is provided, the biometric access control system 134 may cause the door to unlock.

The enterprise location 130 may also include auxiliary data acquisition device 137. In some cases, the biometric access control system 134 may require credentials in addition to biometric data. For example, the biometric access control system 134 may require a person to provide both biometric data and a security token, such as an RFID equipped badge. The auxiliary data acquisition device 137 is used to capture non-biometric data and its use is described in further detail below.

The enterprise location 130 may also include enterprise biometric data store 138. The enterprise biometric data store 138 will typically include the biometric data of members of the enterprise such that the biometric access control system 134 can grant/deny access to people attempting to enter the enterprise location 130. For example, in the case of a commercial enterprise, the enterprise biometric data store 138 may include the biometric data for all active employees. Upon arriving at the enterprise location 130, an employee may provide biometric data via the biometric data acquisition device 136. If the biometric data matches that which is stored in the enterprise biometric data store 138 as being associated with an active employee, the employee may be granted access to the enterprise location 130.

The biometric data stored in the enterprise biometric data store 138 may be stored at a quality that is specific to the biometric access control system 134 in place at the specific enterprise location 130. For example, two different enterprise locations may use facial recognition systems provided by different vendors. Each vendor may have their own requirements for the quality of the image used for access. For example, one vendor may require a 2D enrollment image and a different vendor may require a 3D image. Alternatively, one vendor may require a 100×100 pixel enrollment image and another a 50×50 pixel enrollment image. In some cases, a vendor may have different quality requirements between their own versions (e.g. hardware, software, firmware, etc.) of a given system.

What should be understood is that a specific biometric access control system 134 installed at a specific enterprise location 130 utilizes a format for biometric data that may or may not be the same as the format used for biometric data at other enterprise locations. Furthermore, it should be understood that the defined quality of biometric data described above may not be the same as the quality used by a specific biometric access control system. As will be explained in further detail below, the enterprise biometric data store 138 may also be used to temporarily store the biometric data of first responders responding to an incident at the enterprise location 130.

Enterprise locations 130 may register with the BIF 150 in order to allow first responders to be able to access the enterprise location using biometric identification. When an enterprise 130 registers with the BIF 150, the enterprise may provide information related to the biometric access control in use at the enterprise location. For example, the type of biometric data (e.g. facial recognition, fingerprint, voiceprint, etc.), the vendor of the biometric access control system, the version of hardware/software of the biometric access control system, the particular encoding algorithms used for the biometric data, specific codecs in use, image quality requirements, the type and version of the AI model in use, etc. In other words, the enterprise locations 130 may provide the parameters of the biometric identification data that is needed to grant access to the enterprise location 130. This information may be stored in the enterprise database 153.

Enterprise location 130 may be coupled to BIF 150 via network 180. Network 180, similarly to network 170, may be any type of network that allows communication between BIF 150 and Enterprise location 130, and the techniques described herein are not dependent on any particular type of network 180. Any network capable of allowing BIF 150 to communicate incident and biometric identification related information to and from the enterprise location 130 is suitable for use with the techniques described herein.

In operation, the CAD 112 system at PSAP 110-1 may be made aware of an incident (e.g. medical emergency, fire, crime, etc.) that is occurring that requires first responders to be dispatched to a location. The CAD 112 system may be made aware of an incident through interaction with a person (e.g. a caller to 911, text message, tweet, etc.). The CAD 112 system may be made aware of an incident through interaction with an automated system (e.g. automatic fire alarm, automatic burglar alarm, etc.). The CAD system may be made aware of the location of the incident through different mechanisms. In the simplest case, a call taker at a PSAP may simply ask a 911 caller for the location of the incident. Enhanced 911 systems may provide location information. Automatic incident reporting systems may also provide location information. What should be understood is that the PSAP 110-1 is aware of the location of the incident.

In one implementation, the PSAP 110-1 may then notify the BIF 150, via network 170, that an incident is occurring at the location. The BIF 150 may query the enterprise database 153 to determine if the identified location is associated with an enterprise location 130 that has previously registered with the BIF 150. If so, the BIF 150 may respond to the PSAP 110-1 indicating that first responder biometric access to the enterprise location is being handled by the BIF 150. In other implementations, the PSAP 110-1 may be pre-provisioned with enterprise locations 130 that utilize the BIF 150 to provide biometric access control, thus avoiding the initial query of the BIF 150. What should be understood is that the PSAP 110-1 is made aware that the BIF 150 will handle biometric access control for first responders that will be dispatched to the enterprise location 130. For purposes of the remainder of the disclosure, it will be assumed that the incident is occurring at an enterprise location 130 that utilizes biometric access control, and that the enterprise location 130 has registered with the BIF 150.

PSAP 110-1, utilizing CAD 112 may then determine which first responders will be dispatched to the incident. For example, in the case of a fire, CAD 112 may assign specific firemen to respond to the incident. In the case of a medical emergency, the CAD 112 may assign specific EMS personnel to respond to the incident. For ease of description, it will be assumed that only a single individual, referred to as the first responder, will be dispatched to the incident location. However, it should be understood that the techniques described for the first responder are equally applicable to any number of first responders. The PSAP 110-1 may notify BIF 150 of the identity of the first responder that will be responding to the incident.

The BIF 150 may then gather the different types of biometric identification data that are available for the first responder. For example, the biometric identification data stored for the first responder in RBDS 160. In some cases, the PSAP 110-1 may store the biometric identification data of the first responder in RBDS 116 and may send that information to BIF 150 via network 170. In other words, BIF 150 may be made aware of the available biometric identification data for the first responder, regardless of where that data is stored.

The BIF 150 may then access enterprise database 153 to determine not only the general type of biometric access control (e.g. facial image, fingerprint, voiceprint, etc.) in use at the enterprise location 130-1 where the incident is occurring, but the actual specific biometric access control system 134 (e.g. vendor, hardware version, software version, firmware version, etc.) that is in place at the enterprise location 130-1. The actual specific biometric access control system 134 in place determines the exact parameters of the biometric identification information that is needed by the access control system (e.g. required resolution, coding schemes, specific AI model data, etc.).

The BIF 150 may then determine if data related to the general type of biometric access control in use at the enterprise location 130-1 is generally available to the BIF 150. For example, if the enterprise location 130-1 is using facial recognition, and the BIF 150 has access to an image of the first responders face (e.g. from RBDS 116, 160), then the BIF has access to the type of biometric data in use at the enterprise location. It should be understood that although a facial image is presented as an example, the same determination may be made for any other type of biometric identification data used at the enterprise location. The biometric data available to the BIF 150 from sources such as the RBDS 116, 160 will be referred to as raw biometric data.

The BIF 150 may adapt the raw biometric data for the first responder to be compatible with the specific biometric access control system 134 in use at the enterprise location 130-1 where the incident is occurring, when possible. Some example adaptations may include converting from three dimensional images to two dimensional images, converting video to an image, transcoding audio or video from one codec to a different codec, changing video/image/audio formats or applying filters, changing video/image resolution, color, contrast, brightness, texture, model template information, Artificial Intelligence information, machine learning data, etc. What should be understood is that the BIF 150 may attempt to adapt the available raw biometric data into a format that is usable by the specific biometric access control system 134 in use at the specific enterprise location 130-1. For example, in the case of an image used for facial recognition, the BIF 150 may have an image of the first responder's face at a 12-megapixel resolution (e.g. the defined quality). The specific biometric access control system 134 in use at the specific enterprise location 130-1 may require that images be at a 5-megapixel resolution. The BIF 150 may down convert the resolution from 12 to 5 megapixels. In another case, a specific biometric access control system 134 may utilize a specific bounding box resolution (e.g. 100×100 pixels, etc.) to define a face. The BIF may adapt a higher resolution image to conform to the bounding box requirements of the specific biometric access control system in use.

In some cases, rather than adapting the raw biometric data and sending it to the enterprise location 130-1, the BIF 150 may adapt the raw biometric data by converting it into a format that is directly usable by the specific biometric access control system 134 in use at the enterprise location 130-1. For example, a biometric access control system may typically take raw biometric data (e.g. an image of a face) and convert it to a model (e.g. a model of features on the face).

The model may then be compared with a stored model to determine if a match has occurred. Other models may include texture models, heuristic-based data, optical flow algorithms, 3D face shape models, color gradients, etc. What should be understood is that the BIF 150 may adapt the available raw biometric data to conform with the analytic model in use by the specific biometric access control system 134 in use at the enterprise location 130-1. It is typically not possible to recover the raw biometric data from the analytic model data (e.g. it is a one-way conversion). By sending only the analytic model data, it eliminates the possibility that the raw biometric data is intercepted and used by bad actors.

It should be noted that in some cases, the raw biometric identification data that is available to the BIF 150 may not be suitably adapted for use by the specific biometric access control system 134 in use at the specific enterprise location 130-1. For example, the quality at which the biometric data is stored (e.g. the defined quality) may be lower than that which is required by the specific biometric access control system 134. For example, if the BIF 150 has a 2D enrollment image stored, but the specific biometric access control system 134 requires a 3D image, the adaption is not possible, because it is unlikely that any 2D to 3D conversion would produce an image suitable for use in biometric identification. In general, although it is possible to convert biometric data to a lower quality, it is not possible to convert biometric data to a higher quality.

In such a case, the BIF 150 may notify the first responder that higher quality biometric information is required. In some cases, the first responder may be able to provide the higher quality biometric information in real time. For example, in the case of a facial image, the first responder may be able to use a device such as a smartphone to capture an image at the required quality and send it to the BIF 150. In other cases, the first responder may be directed to a location (e.g. police station, fire house, $3^{rd}$ party biometric data collection center, etc.) where appropriate BDA devices (e.g. 114, 155) are located in order to provide the biometric identification data at the required quality.

The adapted biometric identification information (either the raw adapted biometric data or analytic model data) may then be sent to the enterprise location 130-1. To ensure that the adapted biometric information cannot be misused, the adapted biometric information may be sent from the BIF 150 to the enterprise location 130-1 using encryption. For example, public-private key encryption may be used to ensure that the data cannot be stolen in a decipherable form and that the data that is provided has not been tampered with while in transit to the enterprise location 130-1.

Once received by the specific biometric access control system 134 in use at the enterprise location 130-1, the adapted biometric data may be stored in the enterprise biometric data store 138. In addition, the BIF 150 may notify the enterprise location that an incident is in progress and that a first responder whose biometric information matches the received adapted biometric information is on the way to the enterprise location 130-1.

Upon arrival at the enterprise location 130-1 where the incident is occurring, the first responder may present his biometric data to the BDA 136 device (e.g. press finger on fingerprint scanner, allow picture to be taken, etc.). The specific biometric access control system 134 in use at the enterprise location 130-1 may take the provided biometric data and compare it to the adapted biometric data that was received from the BIF 150. If there is a match, then the first responder may be granted access to the enterprise location, without requiring any further intervention by personnel at the enterprise location. Because the enterprise location has received the information from the BIF 150, which in turn is associated with a CAD incident, the enterprise location 130-1 can be ensured that the first responder is actually responding to an active incident at the enterprise location, unlike the case in which a PIN is used.

At some point, the incident may end. In one implementation, the BIF 150 may inform the enterprise location that the incident is complete based on CAD 112 information indicating that the incident has been resolved. In other cases, a specific time to live (e.g. 1 hour, 2 hours, 1 day, etc.) may be associated with the incident, and the incident ends after that time period. Once the incident has ended, the adapted biometric data that was stored in the enterprise biometric data store 138 may be deleted. Thus, if the first responder should return at some later time, they would not be granted access to the enterprise location 130-1, because there would be no matching adapted biometric data stored.

In some cases, the incident may not have a specific endpoint. For example, in the case of a fire, there may be an initial response (e.g. putting out the fire) that may have a follow up action the next day (e.g. investigate the cause of the fire). Once the initial response is complete, the adapted biometric access data may remain in the data store in a "suspended" state that does not allow the first responder to return that day. However, the next day, during the investigation phase, the adapted biometric data may be revived and thus grant the first responder access to the enterprise location 130-1 during the investigative phase. Expected follow up action and corresponding enterprise location 130-1 access requirements could be based on policies related to incident type.

Matches of biometric identification information is not perfect and is generally based on a confidence level. For example, a facial or fingerprint recognition system may decide biometric identification information is a match when it can determine a match with a defined confidence level (e.g. when the system is 99.5% confident there is a match). In some cases, the BIF 150 may inform the specific biometric access control system 134 in use at the enterprise location 130-1 that it should relax the biometric authentication confidence level based on environmental or other factors related to the incident.

For example, in the case of a fire, the enterprise location may be filled with smoke. If the biometric data acquisition device 136 is of a type that captures images (e.g. facial recognition) the smoke may interfere with the quality of the image that may be captured. As such, the specific biometric access control system 134 may grant access to a first responder who provides an image that does not match the stored biometric identification data with as high a confidence level as would be required under normal, non-incident related circumstances. The required confidence level may also be adjusted based on the severity of the incident type. For example, if a fire is ongoing, or there is an active shooter at the enterprise location 130-1 and civilians are still within the enterprise location 130-1, the urgency of allowing access to the first responder may outweigh the security concerns. In some implementations, where multiple forms of biometric data are needed (e.g. voice print plus fingerprint, etc.), the number of factors needed may be reduced, based on the incident type. For example, in the case of system utilizing voice+fingerprint, when a fire incident occurs, the biometric access control system may be informed that it should omit the fingerprint requirement, as responding firefighters will likely be wearing gloves and would be unable to provide fingerprints easily.

The BIF 150 may also inform the specific biometric access control system 134 in use at the enterprise location 130-1 of first responder characteristics that should be taken into account when the first responder arrives. For example, the first responder may be wearing a uniform, a hat, a self-contained breathing apparatus (SCBA) system, may be carrying a gun, or other characteristics that would be related to a first responder. In some cases, identification information of the equipment itself (e.g. RFID, Quick Response (QR) code, or barcode on a SCBA tank) itself may be provided to the access control system. Using the auxiliary data acquisition device 137, the specific biometric access control system 134 may read this identification information and may further confirm that the first responder is in possession of the expected equipment and is assigned to respond to the incident.

The specific biometric access control system 134 may be informed that the first responder may be experiencing elevated stress, sweat levels, etc. due to the incident. The specific biometric access control system 134 may be informed of expected first responder arrival times, incident types CAD identification information, number of first responders to expect, etc. These specific characteristics may be used by the specific biometric access control system 134 at the enterprise location 130-1 as inputs into the decision process for granting access to the enterprise location 130-1 to the first responder.

It should be understood that although the previous description was based on the BIF 150 obtaining details about the specific biometric access system 134 in use at the enterprise location 130-1 from the enterprise database 153, the techniques are not so limited. In other implementations, the BIF 150 may query the enterprise location 130-1 to determine the specific biometric access system 134 in use.

It should be understood that although the previous description was based on the BIF 150 gathering available biometric data for the first responder prior to identifying the specific biometric access control system 134 in use at enterprise location 130-1, this was only one example implementation. In other implementations, the BIF 150 may first determine what biometric access information is needed by the enterprise biometric access control system 134 and then determine if that information is available (or can be obtained) for the first responder.

It should be understood that although the above description has been described in terms of the BIF 150 obtaining available raw biometric data and adapting the data to conform with the requirements of the biometric access control system 134 at the enterprise location 130-1, the techniques described herein are not so limited. In an alternate implementation, the raw biometric data may be sent to the biometric access control system 134 at the enterprise location, and that adaptation may occur at the enterprise location.

Although the operation of environment 100 has been described in terms of an enterprise physical access system that uses a single type of biometric data (e.g. facial recognition, fingerprint, iris scan, voiceprint, etc.) it should be understood that this was for purposes of ease of description, and not by way of limitation. The techniques described above are equally applicable for enterprise physical access systems that utilize combinations of types of biometric data (e.g. voiceprint+facial recognition, iris scan+fingerprint, etc.). In cases where multiple types of biometric data are utilized, the BIF may adapt each individual type of biometric data accordingly.

Figure 2:
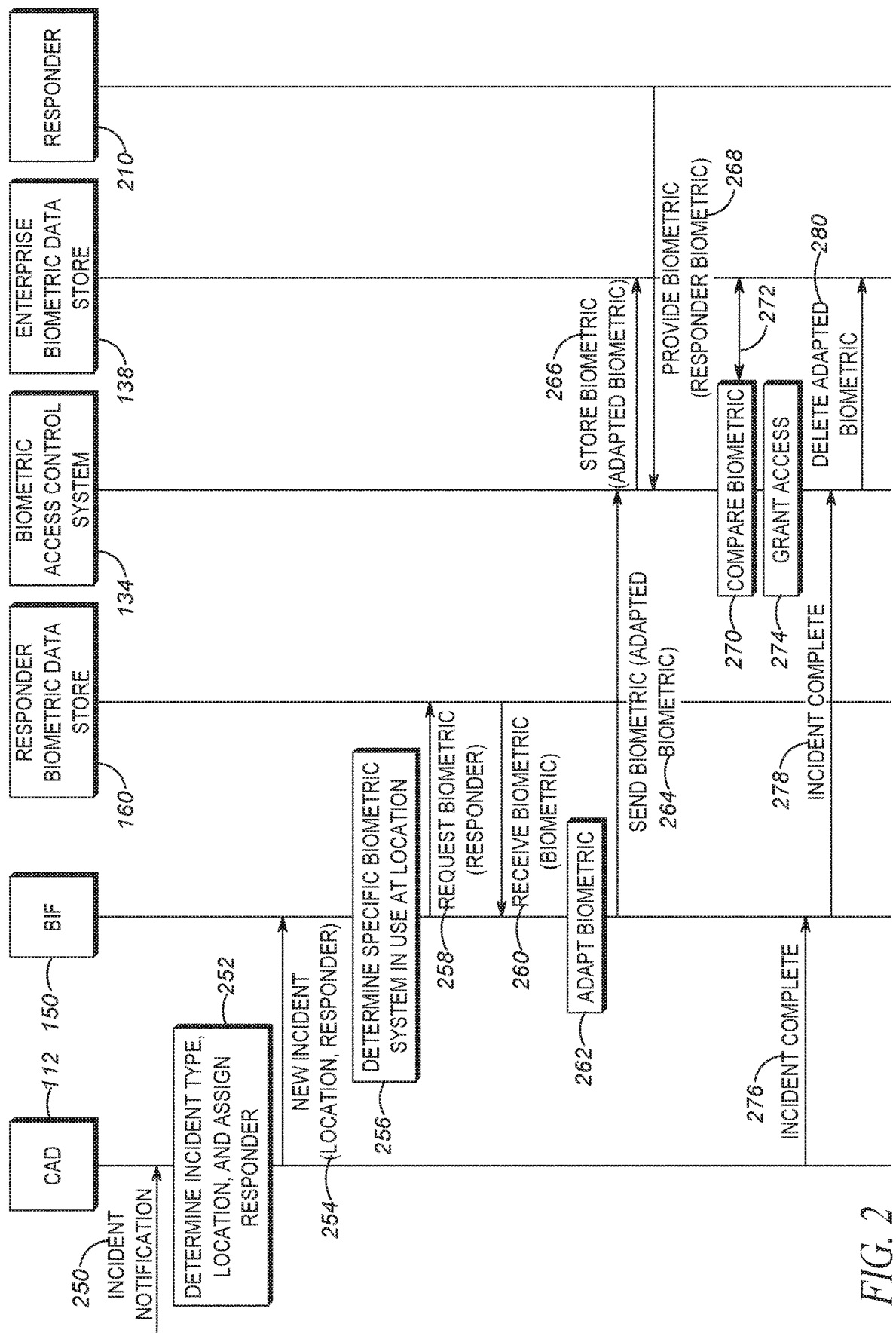
FIG. 2 is an example of a sequence diagram illustrating one example message flow for providing public safety with access to an enterprise.

FIG. 2 is an example of a sequence diagram illustrating one example message flow for providing public safety with access to an enterprise. FIG. 2 includes a CAD 112, a BIF 150, a responder biometric data store 160, a biometric access control system 134, and an enterprise biometric data store 138, all of which correspond to similarly numbered elements in FIG. 1. In addition, FIG. 2 includes responder 210, who is a first responder that will be assigned to an incident occurring at an enterprise location.

In step 250, an incident notification is received at the CAD 112. As explained above the incident notification may come from a person or may come from an automated system. Regardless of the source, the CAD 112 is made aware that an incident has occurred. In step 252, the CAD may determine the incident type and an incident location. The incident type and location may be determined based on information received in the incident notification step 250. The CAD 112 may additionally assign a responder 210 to respond to the incident at the location.

The CAD 112 may then send an indication of a new incident 254 to the BIF 150. The new incident indication may include the location of the incident as well as the identity of the responder who will be responding to the incident. The BIF 150 may then determine the specific biometric system in use at the location 256. As explained above, each location may utilize a biometric identification system that has specific requirements. The BIF 150 may determine the specific requirements of the biometric system in use at the location in order to determine the type and/or quality of biometric data for the responder that needs to be obtained.

The BIF 150 may request biometric data via request biometric message 258 for the responder 210 from a responder biometric data store 160. Although a responder biometric data store 160 that is associated with the BIF 150 is shown, it should be understood that the responder biometric data store may be associated with the CAD 112, or a third party store. In some cases, requesting the biometric data could include requesting the responder 210 provide the biometric data (e.g. using a BDA device such as a smartphone or going to a location with a BDA device). Biometric data for the responder may be received 260.

The received biometric data for the responder may be adapted 262. As explained above, adapting the biometric data may include altering parameters of the data (transcoding, changing resolution, etc.). In some implementations adapting the data includes conforming the biometric data to the analytic format used by the biometric access control system 134. The adapted biometric data for the responder may be sent 264 to the biometric access control system 134, which then in turn stores the adapted biometric data 266 in the enterprise biometric data store 138.

When the responder 210 arrives at the incident location, the responder 210 may provide his biometric data to the biometric access control system 134 (e.g. provide facial image, fingerprint, voiceprint, etc.). The biometric access control system may compare the biometric data 270 with that stored in the enterprise biometric data store. For example, the provided biometric data may be processed by the analytic model used by the biometric access control system and compared with biometric data 272 stored in the enterprise biometric data store 138.

If there is a match, access to the enterprise location may be granted 274 to the first responder 210 by the biometric access control system 134. At some point, the incident may end. The CAD 112 may notify the BIF 150 that the incident is complete 276. The BIF 150 in turn may notify the biometric access control system 134 that the incident is complete 278. The biometric access control system 134 may then cause the enterprise biometric data store 138 to delete the adapted biometric data 280. Thus, the responder 210 would no longer have access to the enterprise location once the incident has completed.

Figure 3A:
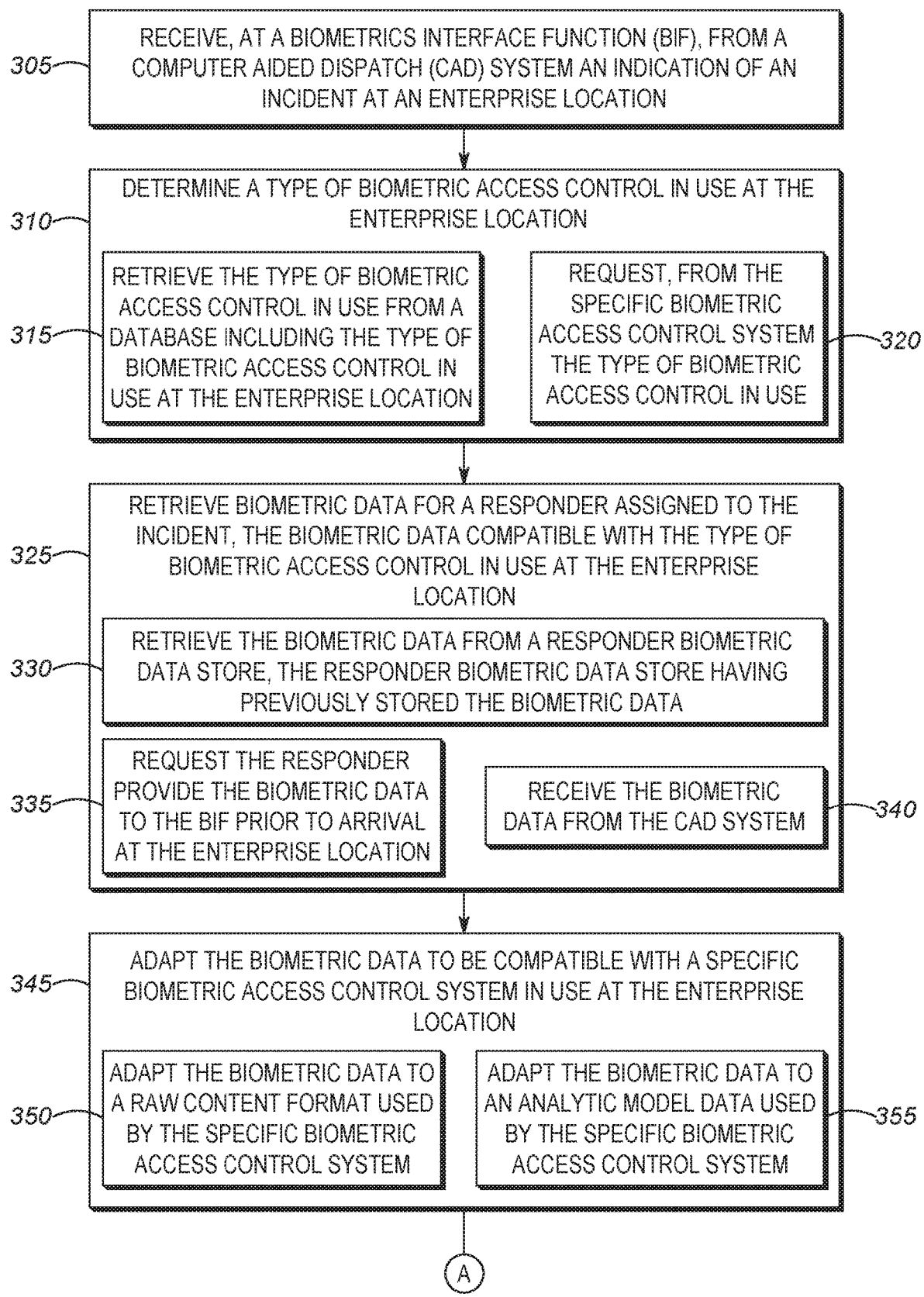
FIGS. 3A and 3B is an example of a flow diagram of a biometric interface function providing public safety with access to an enterprise according to the techniques described herein.
Figure 3B:
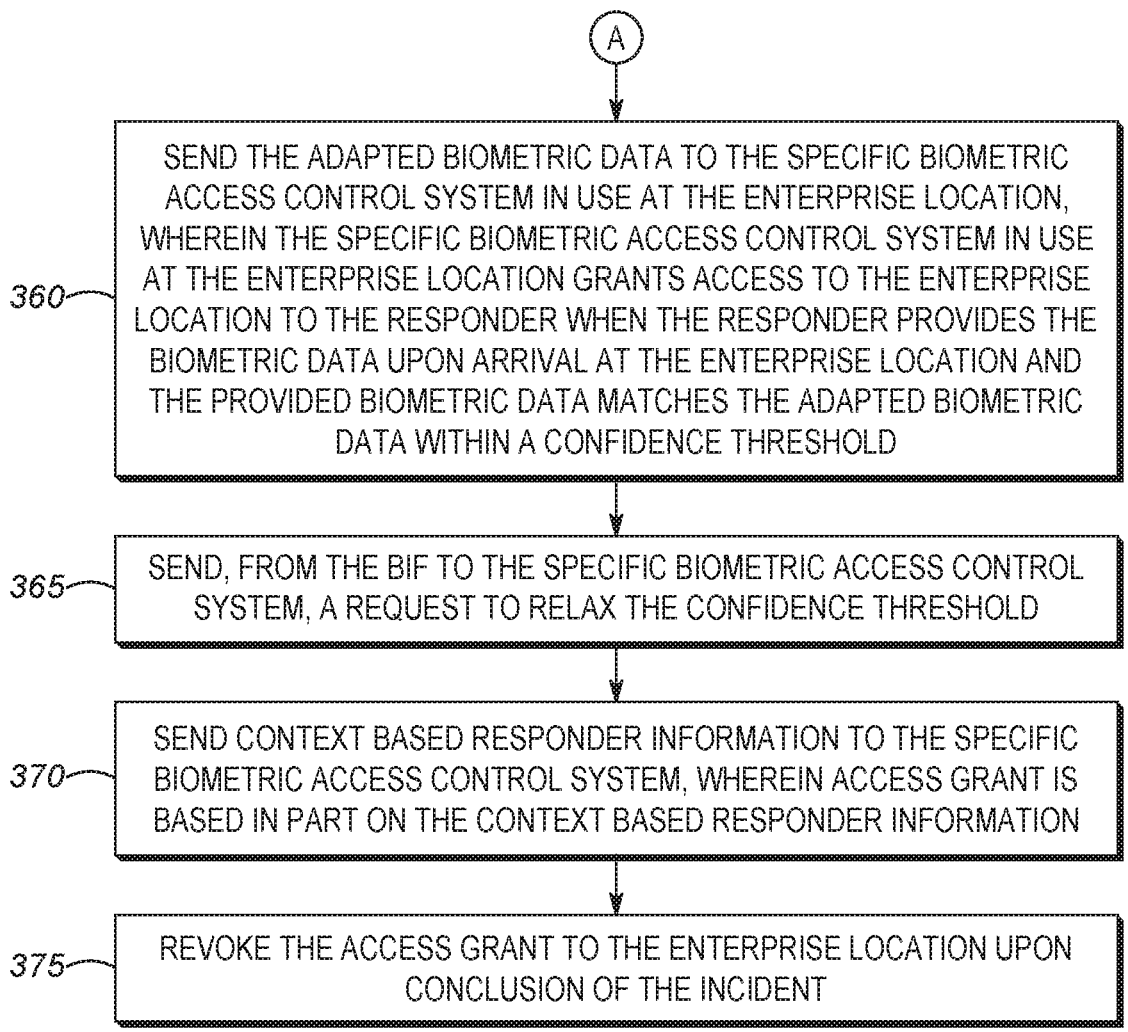

FIGS. 3A and 3B is an example of a flow diagram of a biometric interface function providing public safety with access to an enterprise according to the techniques described herein. In block 305, an indication of an incident at an enterprise location may be received, at a biometrics interface function (BIF), from a computer aided dispatch (CAD) system. As explained above, the CAD system may be part of a PSAP that receives incoming incident notifications that are generated by human callers or automated systems.

In block 310, a type of biometric access control in use at the enterprise location may be determined. Example types of biometric control types can include fingerprints, facial recognition, voice recognition, iris scans, DNA, etc., and combinations thereof. There are different techniques that may be used to determine the type of biometric access control that is in use. In one implementation, in block 315, the type of biometric access control in use may be retrieved from a database including the type of biometric access control in use at the enterprise location. In other words, a database may be maintained that includes the type of biometric access control in use at all enterprise locations that are serviced by the BIF and include biometric access control. In an alternate implementation, in block 320, the type of biometric access control in use may be requested from the specific biometric access control system. In other words, the BIF may send a request to the enterprise location's biometric access control system to request that the type of biometric access control in use be provided. In such an implementation, there may be no need to maintain a database including the biometric access control type information.

In block 325, biometric data for a responder assigned to the incident may be retrieved. The biometric data compatible with the type of biometric access control in use at the enterprise location. In one example implementation, in block 330, the biometric data may be retrieved from a responder biometric data store, the responder biometric data store having previously stored the biometric data. In another example implementation, in block 335, the responder may be requested to provide the biometric data to the BIF prior to arrival at the enterprise location. For example, the responder may be requested to provide the data using a device in his possession (e.g. biometric data acquisition included in a smartphone) or may be requested to go to a location with an appropriate biometric data acquisition device. In yet another example, implementation, in block 340 the biometric data may be received from the CAD system. In such an implementation, it is not necessary for the BIF to maintain the biometric data for all possible responders, but instead only needs request the data of responders actually assigned to an incident.

In block 345, the biometric data may be adapted to be compatible with a specific biometric access control system in use at the enterprise location. As mentioned above, each enterprise location may have installed a specific type of biometric access control system (e.g. specific vendor, specific hardware/software version, specific model). The biometric data may be adapted to be compatible with the specific biometric access control system in use at the enterprise location. In one example, implementation, in block 350, the biometric data may be adapted to a raw content format used by the specific biometric access control system.

For example, parameters of the raw biometric data (e.g. resolution, codec, sampling rate, etc.) may be adapted to be compatible with the specific biometric access control system in use at the enterprise location. In another example implementation, in block 355, the biometric data may be adapted to an analytic model data used by the specific biometric access control system. By adapting the raw biometric data to the analytic model used by the specific access control system in use at the enterprise location, the raw biometric data need not be sent over the network, thus further reducing the possibility that the raw biometric data may be compromised.

In block 360, the adapted biometric data may be sent to the specific biometric access control system in use at the enterprise location, wherein the specific biometric access control system in use at the enterprise location grants access to the enterprise location to the responder when the responder provides the biometric data upon arrival at the enterprise location and the provided biometric data matches the adapted biometric data within a confidence threshold. In other words, the specific biometric access control system is provided with biometric data that can be compared to the biometric data that is physically provided by a first responder arriving on scene at the enterprise location. If the adapted biometric data matches the biometric data provided by the first responder, the first responder may be granted access to the enterprise location.

In block 365, a request to relax the confidence threshold may be sent from the BIF to the specific biometric access control system. As explained above, in a situation where public safety personnel are responding to an incident at an enterprise location, the severity of the incident may mean that granting first responder access is more important than ensuring that a false positive match of biometric data occurs. Thus, the BIF may request that the specific biometric access control system lower the confidence threshold for determining that there is a biometric data match.

In block 370 context based responder information may be sent to the specific biometric access control system, wherein access grant is based in part on the context based responder information. As explained above, context based information can include characteristics of the responder such as wearing a uniform, a SCBA mask, possession of other responder specific equipment, etc. In some cases, the context may include specific identification (e.g. bar codes, RFID tags, etc.) affixed to equipment carried by the responder.

In block 375, the access grant to the enterprise location may be revoked upon conclusion of the incident. As mentioned above, the responder's ability to access the enterprise location should generally be limited to the period of time that the incident is active (e.g. to prevent a responder from accessing the location at some time, well after the incident is complete). In some cases, the revocation may be immediate upon completion of the incident. In some cases, the revocation may allow for the access grant to be revived at a defined later period of time to allow the responder to return to conduct incident follow up investigation (e.g. arson investigation, forensic crime scene investigation, etc.)

Figure 4:
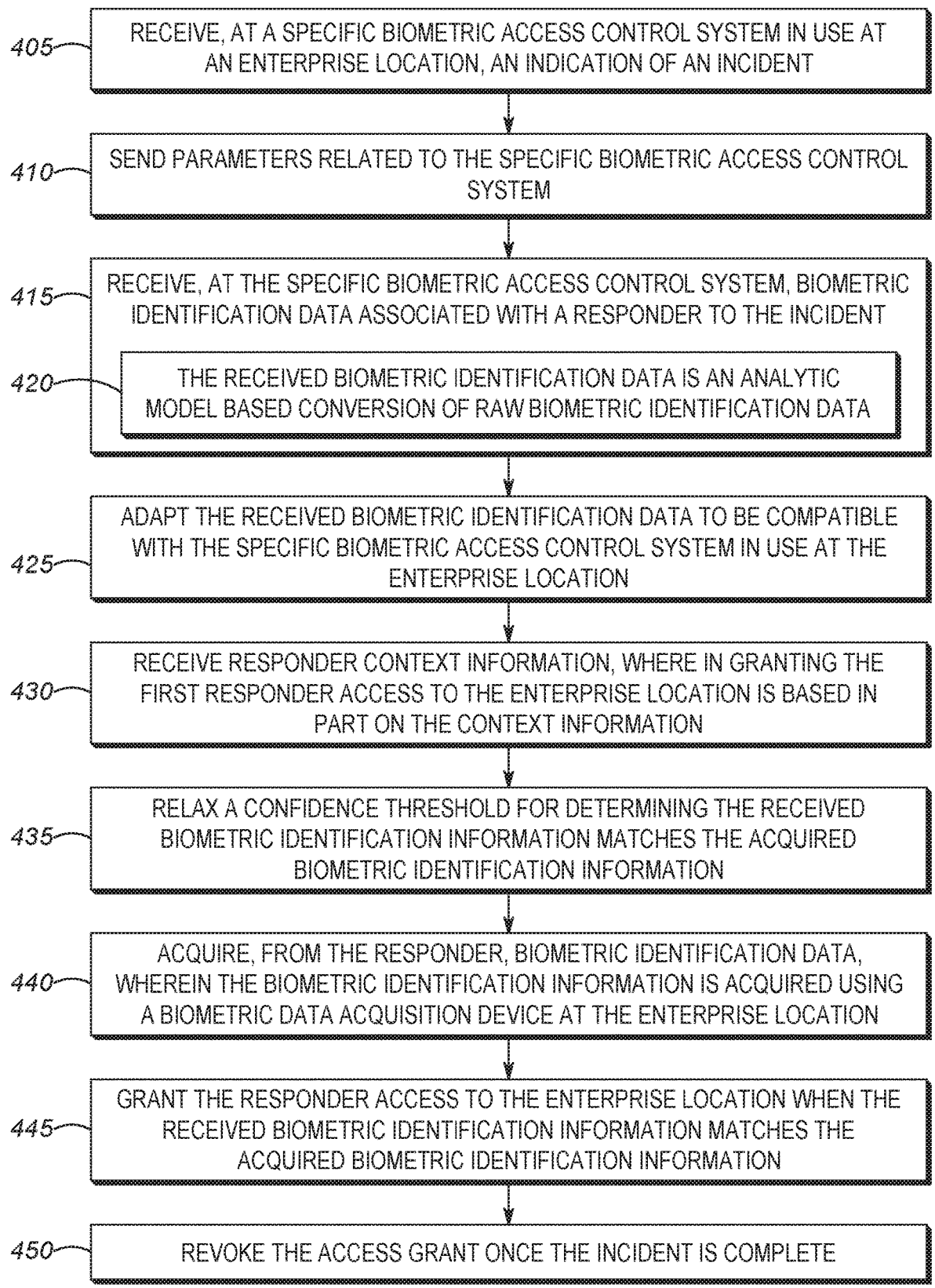
FIG. 4 is an example of a flow diagram of an enterprise biometric access control system providing public safety with access to an enterprise according to the techniques described herein.

FIG. 4 is an example of a flow diagram of an enterprise biometric access control system providing public safety with access to an enterprise according to the techniques described herein. In block 405, an indication of an incident may be received at a specific biometric access control system in use at an enterprise location. As explained above, an incident may be received by a CAD system which forwards the incident to a BIF. The BIF may in turn send an indication of the incident to the specific biometric access control system that is being used to control physical access to an enterprise location.

At block 410, parameters related to the specific biometric access control system may be sent. In some implementations, the BIF may not have access to the type of biometric access control that is in use at the enterprise location (e.g. there is no enterprise database). In such implementations the BIF may query the specific access control system in use, and the access control system may send a response indicating the parameters related to that specific system (e.g. type of biometric, system vendor, hardware/software versions, codecs in use, AI model type and version, resolution, etc.).

In block 415, biometric identification data associated with a responder to the incident may be received at the specific biometric access control system. For example, the BIF may provide biometric data related to the responder who will be dispatched to the enterprise location. As shown in block 420, the received biometric identification data may be an analytic model based conversion of raw biometric identification data. Sending the analytic model data allows the system to function without having to send the raw biometric data, which may be more vulnerable to abuse in case the raw data is ever compromised.

In block 425, the received biometric identification data may be adapted to be compatible with the specific biometric access control system in use at the enterprise location. As explained above, in some cases the received biometric data may be incompatible with the system in use (e.g. incorrect resolution, codec, sampling rate, etc.). If possible the received biometric data may be adapted to be compatible with the specific biometric access control system in use at the enterprise location.

In block 430, responder context information may be received, wherein granting the first responder access to the enterprise location is based in part on the context information. Responder context information may include expected environmental conditions (e.g. smoke in the enterprise location, etc.), uniform markings, the number of responders, rank or role of the responder(s), equipment the responder may be wearing (e.g. SCBA mask, etc.), and identification information for that equipment. Context information may be any information that is not directly related to biometric information, but may also be used to make the decision as to if access to the enterprise location is granted.

In block 435, a confidence threshold for determining the received biometric identification information matches the acquired biometric identification information may be relaxed. As explained above, in some cases the severity of the ongoing incident may outweigh the need for absolute certainty in granting access to a responder. In such cases, the system may lower a confidence threshold such that biometric identifications that match based on the lowered threshold will still allow access to the enterprise location. In some implementations where multiple biometric factors may be used for determining if access is granted, relaxing the confidence threshold may include omitting one or more of the multiple factors.

In block 440, biometric identification data may be acquired from the responder. The biometric identification information is acquired using a biometric data acquisition device at the enterprise location. In other words, the responder arrives at the enterprise location and presents biometric identification information (e.g. facial image, fingerprint, voiceprint, etc.). In block 445, the first responder may be granted access to the enterprise location when the received biometric identification information matches the acquired biometric identification information (e.g. at the required confidence level). In block 450, the access grant may be revoked once the incident is complete.

Figure 5:
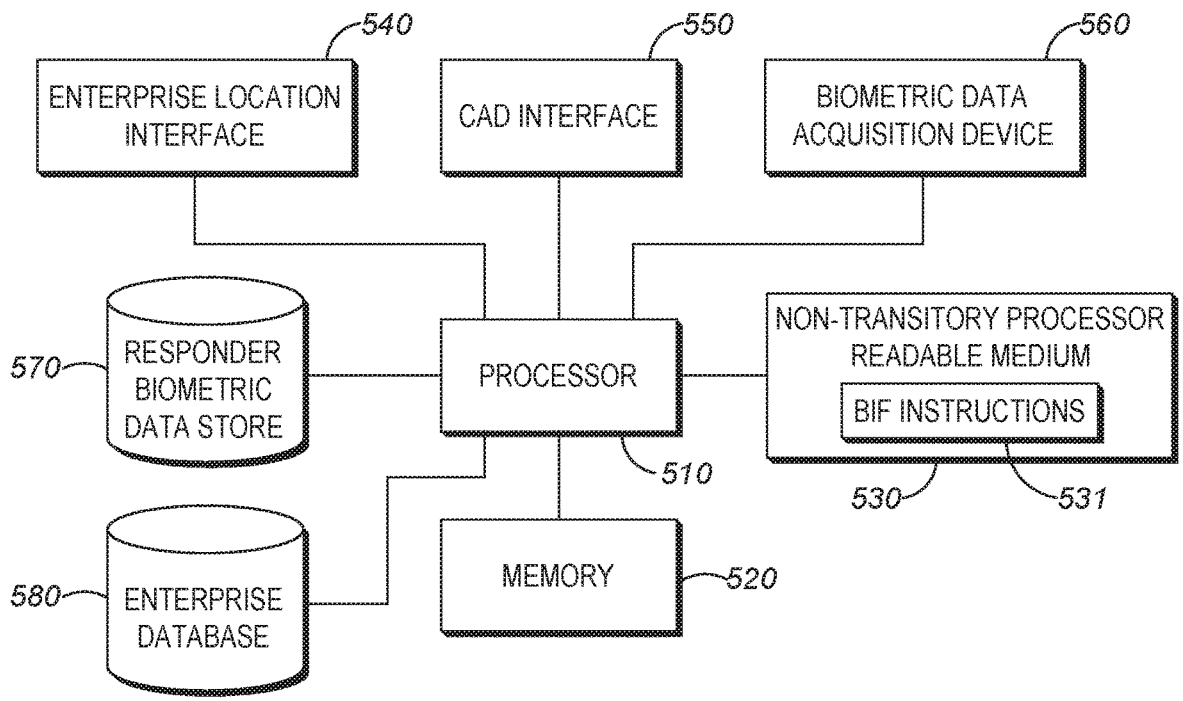
FIG. 5 is an example of a device that may implement the Biometric Interface Function techniques to provide public safety access to an enterprise described herein.

FIG. 5 is an example of a device that may implement the Biometric Interface Function techniques to provide public safety access to an enterprise described herein. It should be understood that FIG. 5 represents one example implementation of a computing device that utilizes the techniques described herein. Although only a single processor is shown, it would be readily understood that a person of skill in the art would recognize that distributed implementations are also possible. For example, the various pieces of functionality described above (e.g. BIF instructions, etc.) could be implemented on multiple devices that are communicatively coupled. FIG. 5 is not intended to imply that all the functionality described above must be implemented on a single device.

Device 500 may include processor 510, memory 520, non-transitory processor readable medium 530, enterprise location interface 540, CAD interface 550, biometric data acquisition device 560, responder biometric data store 570, and enterprise database 580.

Processor 510 may be coupled to memory 520. Memory 520 may store a set of instructions that when executed by processor 510 cause processor 510 to implement the techniques described herein. Processor 510 may cause memory 520 to load a set of processor executable instructions from non-transitory processor readable medium 530. Non-transitory processor readable medium 530 may contain a set of instructions thereon that when executed by processor 510 cause the processor to implement the various techniques described herein.

For example, medium 530 may include BIF instructions 531. The BIF instructions may cause device 500 to implement the functionality of a BIF system. For example, the BIF instructions may cause the device to receive incident notifications from a CAD system and provide responder biometric information to a specific biometric access control system at an enterprise location. The functionality provided by the BIF instructions 531 is described throughout the specification, including places such as blocks 305-375 in FIG. 3.

The device 500 may include enterprise location interface 540 through which the device communicates with the enterprise locations. For example, the enterprise location interface may be the interface through which the device connects to network 180. The device may also include CAD interface 550 through which the device communicates with CAD systems. For example, the CAD interface may be the interface through which the device connects to network 170.

The device 500 may include biometric data acquisition device 560. As explained above, in some cases, the BIF may itself acquire biometric information form the responders and store that data. For example, the responder biometric data may be stored in responder biometric data store 570. The device may also include enterprise database 580. In some implementations, enterprise location data, such as the specific biometric access control system used at an enterprise location, is stored in the enterprise database. The BIF may then use the stored enterprise data to determine the type of biometric data that is sent to the enterprise via the enterprise location interface 540.

Figure 6:
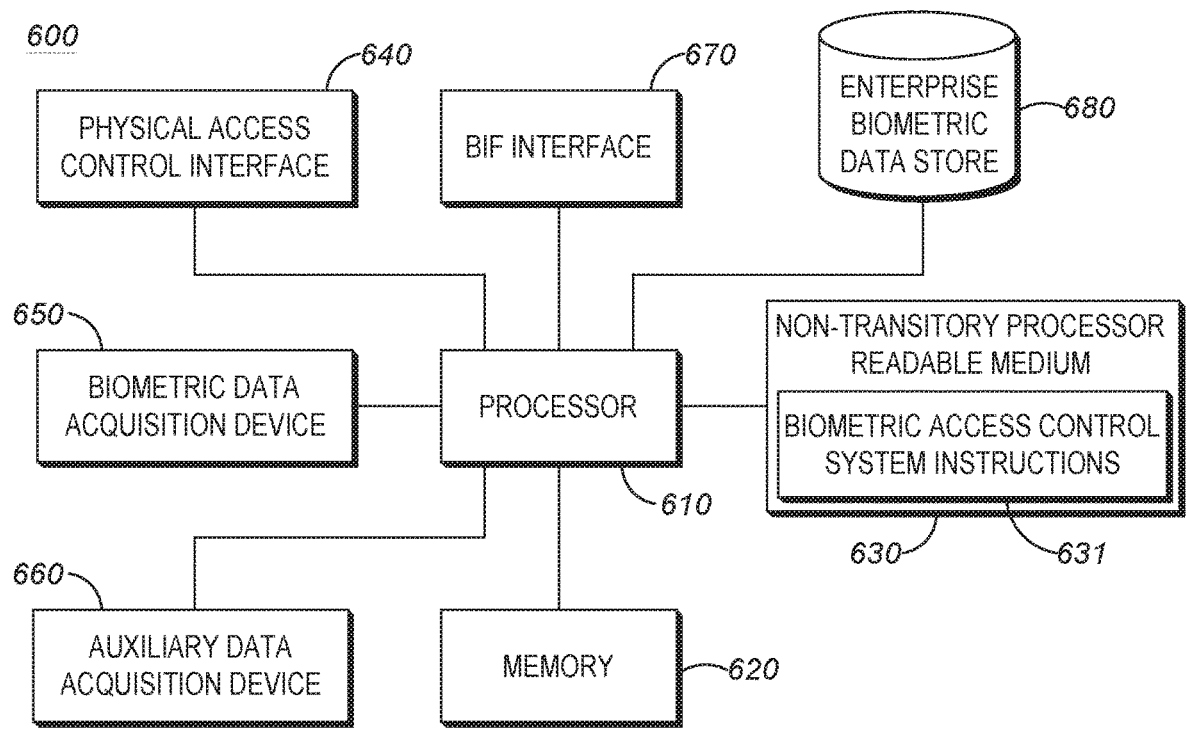
FIG. 6 is an example of a device that may implement the Biometric Access Control system techniques to provide public safety access to an enterprise described herein.

FIG. 6 is an example of a device that may implement the Biometric Access Control system techniques to provide public safety access to an enterprise described herein. It should be understood that FIG. 6 represents one example implementation of a computing device that utilizes the techniques described herein. Although only a single processor is shown, it would be readily understood that a person of skill in the art would recognize that distributed implementations are also possible. For example, the various pieces of functionality described above (e.g. biometric access control system instructions, etc.) could be implemented on multiple devices that are communicatively coupled. FIG. 6 is not intended to imply that all the functionality described above must be implemented on a single device.

Device 600 may include processor 610, memory 620, non-transitory processor readable medium 630, physical access control interface 640, biometric data acquisition device 650, auxiliary data acquisition device 660, BIF interface 670, and enterprise biometric data store 680.

Processor 610 may be coupled to memory 620. Memory 620 may store a set of instructions that when executed by processor 610 cause processor 610 to implement the techniques described herein. Processor 610 may cause memory 620 to load a set of processor executable instructions from non-transitory processor readable medium 630. Non-transitory processor readable medium 630 may contain a set of instructions thereon that when executed by processor 610 cause the processor to implement the various techniques described herein.

For example, medium 630 may include biometric access control system instructions 631. The biometric access control system instructions may cause device 600 to implement the functionality of a biometric access control system. For example, the biometric access control system instructions may cause the device to receive incident notifications from a BIF system as well as responder biometric identification data. This data may be used to determine if a responder is granted access to the enterprise location. The functionality provided by the biometric access control system instructions 631 is described throughout the specification, including places such as blocks 405-450 in FIG. 4.

The device 600 may include physical access control interface 640 through which the device communicates with the physical devices (e.g. electronic door locks, electrically controlled gates, etc.) that physically control access to the enterprise location. The device may use the physical access control interface to command the physical access devices to either allow or deny access to a responder.

Device 600 may also include biometric data acquisition device 650 through which responder biometric data is acquired when a responder arrives at the enterprise location. This acquired biometric data may then be compared with biometric data received form the BIF to determine if access to the enterprise location should be granted. The device may also include auxiliary data acquisition device 660. As explained above, in some implementations, additional data (e.g. equipment QR codes/bar codes/RFID tags, etc.) that is not biometric data may also be used when determining if access to the enterprise location should be granted. This additional data may be acquired using the auxiliary data acquisition device.

The device 600 may also include BIF interface 670. The BIF interface may allow the device to receive indications of incidents from the BIF. It may also allow the device to receive biometric information and auxiliary information from the BIF. The BIF interface, for example, may be the interface to the network 180 that provides communication between the BIF and the enterprise location.

The device 600 may also include enterprise biometric data store 680. The enterprise biometric data store may be used to store the biometric information of people who are authorized to access the enterprise location (e.g. employees, students, etc.). When an incident occurs, the device may temporarily store the biometric data received from the BIF in the enterprise biometric data store. When the responder arrives at the enterprise location, the biometric data provided by the responder can be compared to the stored biometric data that was received from the BIF in order to determine if the responder should be granted access to the enterprise location.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The phrase "at least one of elements A and B" should be interpreted as any number of element A alone, any number of element B alone, or any number of both elements A and B. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a compact disc read only memory (CD-ROM), an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (IC) with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
    receiving, at a biometrics interface function (BIF), from a computer aided dispatch (CAD) system an indication of an incident at an enterprise location;
    determining a type of biometric access control in use at the enterprise location;
    retrieving biometric data for a responder assigned to the incident, the biometric data compatible with the type of biometric access control in use at the enterprise location;
    adapting the biometric data to be compatible with a specific biometric access control system in use at the enterprise location; and
    sending the adapted biometric data to the specific biometric access control system in use at the enterprise location, wherein the specific biometric access control system in use at the enterprise location grants access to the enterprise location to the responder when the responder provides the biometric data upon arrival at the enterprise location and the provided biometric data matches the adapted biometric data within a confidence threshold.

2. The method of claim 1 further comprising:
    revoking the access grant to the enterprise location upon conclusion of the incident.

3. The method of claim 1 wherein adapting the biometric data comprises at least one of:
adapting the biometric data to a raw content format used by the specific biometric access control system; and
adapting the biometric data to an analytic model data used by the specific biometric access control system.

4. The method of claim 1 further comprising:
sending, from the BIF to the specific biometric access control system, a request to relax the confidence threshold.

5. The method of claim 1 wherein retrieving biometric data for a responder comprises at least one of:
retrieving the biometric data from a responder biometric data store, the responder biometric data store having previously stored the biometric data;
requesting the responder provide the biometric data to the BIF prior to arrival at the enterprise location; and
receiving the biometric data from the CAD system.

6. The method of claim 1 wherein determining the type of biometric access control in use at the enterprise location further comprises at least one of:
retrieving the type of biometric access control in use from a database including the type of biometric access control in use at the enterprise location; and
requesting, from the specific biometric access control system the type of biometric access control in use.

7. The method of claim 1 further comprising:
sending context based responder information to the specific biometric access control system, wherein access grant is based in part on the context based responder information.

8. A system comprising:
a processor; and
a memory coupled to the processor, the memory containing a set of instructions thereon that when executed by the processor cause the processor to:
receive, at a biometrics interface function (BIF), from a computer aided dispatch (CAD) system an indication of an incident at an enterprise location;
determine a type of biometric access control in use at the enterprise location;
retrieve biometric data for a responder assigned to the incident, the biometric data compatible with the type of biometric access control in use at the enterprise location;
adapt the biometric data to be compatible with a specific biometric access control system in use at the enterprise location; and
send the adapted biometric data to the specific biometric access control system in use at the enterprise location, wherein the specific biometric access control system in use at the enterprise location grants access to the enterprise location to the responder when the responder provides the biometric data upon arrival at the enterprise location and the provided biometric data matches the adapted biometric data within a confidence threshold.

9. The system of claim 8 further comprising instructions to:
revoke the access grant to the enterprise location upon conclusion of the incident.

10. The system of claim 8 wherein the instructions to adapt the biometric data comprises at least one of instructions to:
adapt the biometric data to a raw content format used by the specific biometric access control system; and
adapt the biometric data to an analytic model data used by the specific biometric access control system.

11. The system of claim 8 further comprising instructions to:
send, from the BIF to the specific biometric access control system, a request to relax the confidence threshold.

12. The system of claim 8 wherein the instructions to retrieve biometric data for a responder comprises at least one of instructions to:
retrieve the biometric data from a responder biometric data store, the responder biometric data store having previously stored the biometric data;
request the responder provide the biometric data to the BIF prior to arrival at the enterprise location; and
receive the biometric data from the CAD system.

13. The system of claim 8 wherein the instructions to determine the type of biometric access control in use at the enterprise location further comprises at least one of instructions to:
retrieve the type of biometric access control in use from a database including the type of biometric access control in use at the enterprise location; and
request, from the specific biometric access control system the type of biometric access control in use.

14. The system of claim 8 further comprising instructions to:
send context based responder information to the specific biometric access control system, wherein access grant is based in part on the context based responder information.

15. A non-transitory processor readable medium containing a set of instructions thereon that when executed by a processor cause the processor to:
receive, at a biometrics interface function (BIF), from a computer aided dispatch (CAD) system an indication of an incident at an enterprise location;
determine a type of biometric access control in use at the enterprise location;
retrieve biometric data for a responder assigned to the incident, the biometric data compatible with the type of biometric access control in use at the enterprise location;
adapt the biometric data to be compatible with a specific biometric access control system in use at the enterprise location; and
send the adapted biometric data to the specific biometric access control system in use at the enterprise location, wherein the specific biometric access control system in use at the enterprise location grants access to the enterprise location to the responder when the responder provides the biometric data upon arrival at the enterprise location and the provided biometric data matches the adapted biometric data within a confidence threshold.

16. The medium of claim 15 further comprising instructions to:
revoke the access grant to the enterprise location upon conclusion of the incident.

17. The medium of claim 15 wherein the instructions to adapt the biometric data comprises at least one of instructions to:
adapt the biometric data to a raw content format used by the specific biometric access control system; and
adapt the biometric data to an analytic model data used by the specific biometric access control system.

18. The medium of claim 15 further comprising instructions to:
send, from the BIF to the specific biometric access control system, a request to relax the confidence threshold.

19. The medium of claim 15 wherein the instructions to retrieve biometric data for a responder comprises at least one of instructions to:
retrieve the biometric data from a responder biometric data store, the responder biometric data store having previously stored the biometric data;
request the responder provide the biometric data to the BIF prior to arrival at the enterprise location; and
receive the biometric data from the CAD system.

20. The medium of claim 15 wherein the instructions to determine the type of biometric access control in use at the enterprise location further comprises at least one of instructions to:
retrieve the type of biometric access control in use from a database including the type of biometric access control in use at the enterprise location; and
request, from the specific biometric access control system the type of biometric access control in use.

* * * * *